Sept. 19, 1961

J. R. SEBASTIAN 3,000,490

ACCUMULATOR CONVEYOR

Filed April 2, 1958

INVENTOR.
JAMES R. SEBASTIAN

BY *Price and Heneveld*

ATTORNEYS

Sept. 19, 1961

J. R. SEBASTIAN 3,000,490

ACCUMULATOR CONVEYOR

Filed April 2, 1958

INVENTOR.
JAMES R. SEBASTIAN
BY
Price and Heneveld
ATTORNEYS

Sept. 19, 1961   J. R. SEBASTIAN   3,000,490
ACCUMULATOR CONVEYOR
Filed April 2, 1958   3 Sheets-Sheet 3

*INVENTOR.*
JAMES R. SEBASTIAN
BY Price and Heneveld
ATTORNEYS

United States Patent Office 3,000,490
Patented Sept. 19, 1961

1

3,000,490
ACCUMULATOR CONVEYOR
James R. Sebastian, East Grand Rapids, Mich., assignor to The Rapids-Standard Company, Incorporated, Grand Rapids, Mich., a corporation of Michigan
Filed Apr. 2, 1958, Ser. No. 725,970
3 Claims. (Cl. 198—184)

This invention relates to article conveyors in general and more particularly to accumulator conveyors.

Accumulator conveyors are continuously operated conveyors which are intended to allow articles to accumulate on them rather than to be passed from them. This may be desirable for any of a number of reasons, such as allowing a time lapse for the subsequent conveyor unloading operation, to group articles together rather than having them widely spaced and at irregular intervals, etc. Such conveyors require that the operating mechanism of the conveyor continue in operation while the articles pile up against a stop and the article moving apparatus passes under the accumulated articles.

Conventionally known conveyors are not suitable for use as accumulator conveyors. Belt conveyors have been used for such purposes. However, when articles are stopped on a conventionally known type of belt conveyor and the belt continues to move under the articles there is considerable frictional wear on the belt and on the articles themselves. There is also considerable end pressure built up on the accumulated articles due to the cumulative frictional load on the articles. Furthermore, conventionally known conveyors are intended to carry moving loads and are subject to overloading when articles are piled up on the conveyor. Increasing the load capacity of the conveyor increases the initial cost of the conveyor and its operating expense and does not cope with the problems of frictional wear and end pressure loading.

Accumulator conveyors preferably include a movable conveyor means operating between spaced friction free guides, such as rollers or wheeled conveyor tracks. In such conveyors the movable conveyor means need only be lightly engaged with the articles since the articles are supported principally by the side guides. To further minimize the loading on the movable conveyor means such conveyors have been adapted to have the whole conveyor means supported for self-adjustment relative to the articles supported on the guide rails. However, these conveyors are overly responsive to the accumulated weight over the length of the conveyor. An exceptionally heavy article or an accumulation of articles at one location may depress the entire movable conveyor means out of engagement with the other articles. This causes some of the articles to be pushed along on the conveyor by the other articles and increases the frictional loading on the conveyor and the end pressure loading because of the greater weight to be moved.

It is the purpose and object of this invention to provide a new and improved accumulator conveyor. The accumulator conveyor of this invention makes use of a plurality of separate and individually mounted members for supporting different parts of a conveyor belt in suitable engagement with articles carried on the conveyor. Each different section of the article engaging conveyor belt is frictionally engaged with the articles thereon independent of the extent of engagement or lack thereof as regards other sections of the conveyor belt. In this manner the accumulator conveyor proposed operates independent of the overall weight of articles carried or accumulated on the conveyor as a whole.

The conveyor of this invention makes use of a plurality of separate members arranged in tandem between or adjacent friction free conveyor guide rails adapted

2 to support the principal weight of the articles on the conveyor. Each of these members is mounted on light springs and is adapted to have the conveyor belt guided over them. The light spring mounting holds the conveyor belt lightly biased against articles carried on the conveyor bed. However, each different section of the conveyor belt, as it passes over different support members, is biased independent of other parts of the conveyor belt. Thus an exceptionally heavy article or accumulation of articles on the conveyor will not depress the whole conveyor out of engagement with other articles, nor change the extent of engagement of other parts of the belt with the other articles, nor in any other way affect them.

The particular spring mounting disclosed for the conveyor belt supporting members comprises a saddle bracket received over a cross rail of the conveyor bed and having separate spring posts for the adjacently disposed ends of different supporting members. Each belt supporting member is spring mounted on the conveyor frame at its opposite ends. The support members are of a structural shape used elsewhere in the conveyor bed structure and include a belt guiding feature. They also provide for easy movement of the belt thereover by including conveyor wheels as will be described.

The conveyor disclosed is most economically manufactured and assembled. Numerous parts of this conveyor are basically similar and in some instances identical. Many parts are the same except for their length or size while others differ only as regards their use. The conveyor supporting sections are lengths of the same type rail as is used in providing the friction reducing rails along the sides of the driven conveyor. The cross members and vertical supports of the conveyor bed also may be formed from lengths of the same rail structure. All parts are preferably secured together by bolt fasteners. The simplicity of construction and interchangeability of parts contributes appreciably in the reduction of manufacturing, fabrication, shipping and assembly problems and incident costs.

The aforementioned purposes, objects and advantages of this invention will be more apparent in the illustrations and description of a working embodiment thereof which follows.

The preferred form of conveyor embodying the features of this invention includes a bed frame including a plurality of leg members disposed in pairs and having a cross member secured therebetween. Mounted on the cross members are parallel spaced friction reducing rails which form, and extend, the length of the conveyor bed. The friction reducing rails are equipped with conveyor wheels. A power driven conveyor member, comprising an endless belt, is mounted between the friction reducing rails. The belt extends from one end of the conveyor bed to the other. Means for driving the conveyor belt are provided at one end of the conveyor bed and means for adjusting and tensioning the belt are provided at the other end thereof.

The conveyor belt is supported on a plurality of separate conveyor wheel rails disposed in tandem under the conveyor belt member. Each end of each conveyor wheel rail member is resiliently supported upon one of the conveyor bed cross members. In this manner each conveyor supporting member is independent of each other conveyor supporting member. The conveyor supporting members are adapted to independently support and bias the load carrying surface of the conveyor belt in a plane above the load carrying surface of the friction reducing rail members on each side thereof. Different areas of the conveyor belt may be depressed to within or lower than the load carrying plane of the friction reducing rail members without affecting other areas of the conveyor belt disposed over other of the conveyor supporting members.

Figure 1:
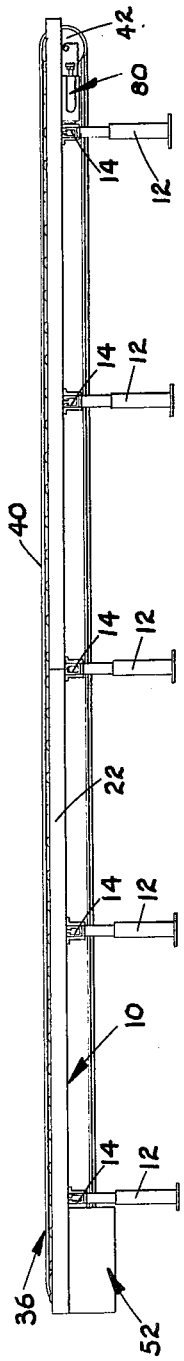
FIG. 1 is a side elevation view of a power driven conveyor of this invention.
Figure 2:
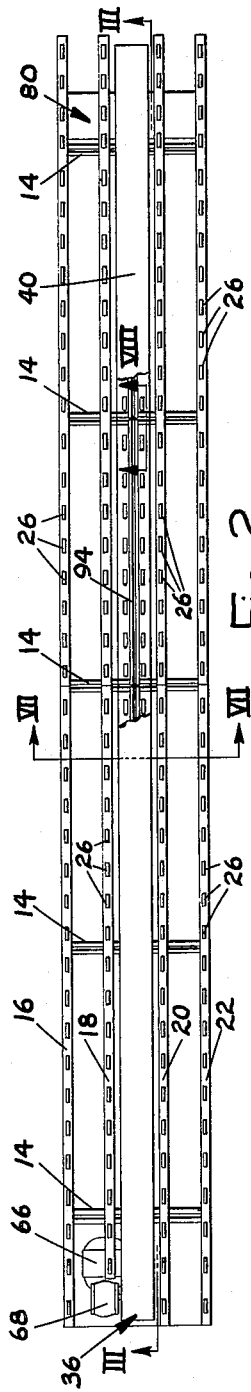
FIG. 2 is a top plan view of the conveyor shown by FIG. 1.
Figure 3:
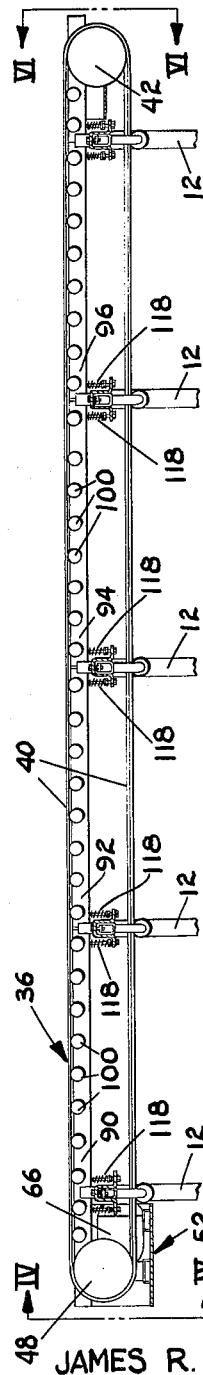
FIG. 3 is a cross sectional side elevation view of the conveyor shown by FIGS. 1 and 2 as seen in the plane of line III—III of FIG. 2 and looking in the direction of the arrows thereon.

With reference to FIGS. 1–3, this particular accumulator conveyor is shown to include a conveyor bed 10 having a series of adjustable leg members 12 with cross member 14 secured between adjacent pairs thereof. Friction reducing rails 16, 18, 20 and 22 are mounted in parallel spaced relation to each other on the cross members 14 and extend the length of the conveyor bed.

Figure 4:
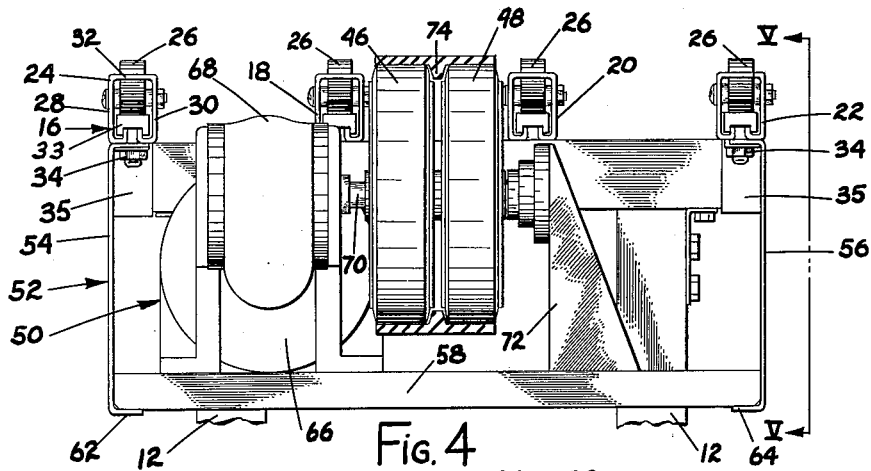
FIG. 4 is an end view of the proposed conveyor means taken substantially in the plane of line IV—IV of FIG. 3 and looking in the direction of the arrows thereon.
Figure 5:
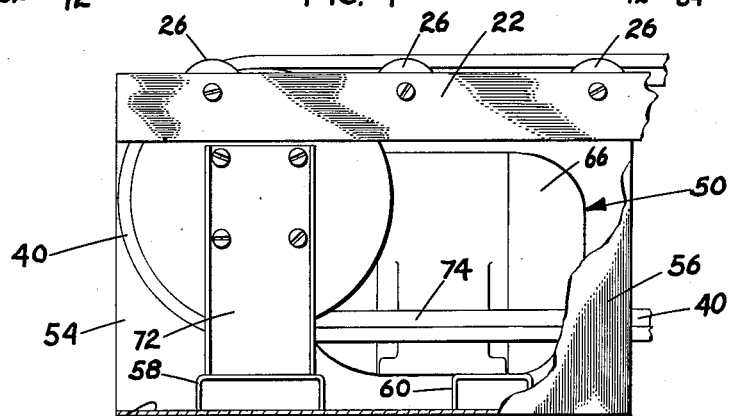
FIG. 5 is an enlarged side elevation view of the conveyor drive means as seen in the plane of line V—V of FIG. 4 and looking in the direction of the arrows thereon.
Figure 6:
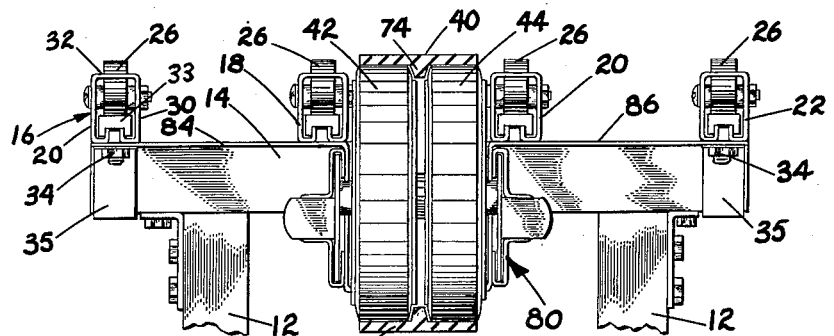
FIG. 6 is an enlarged end view of the conveyor adjustment means as seen in the plane of line VI—VI of FIG. 3 and looking in the direction of the arrows thereon.
Figure 7:
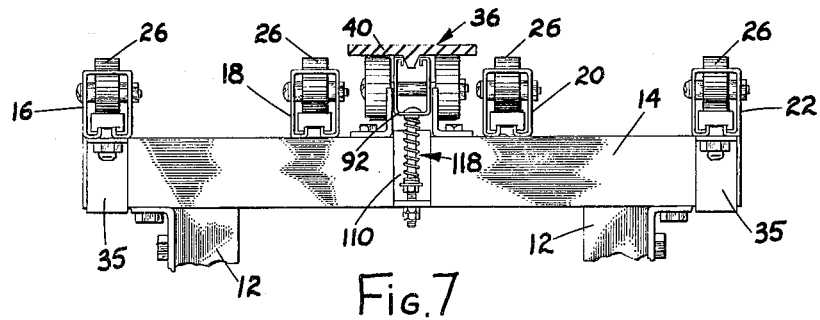
FIG. 7 is a cross sectional view of the proposed conveyor means as seen in the plane of line VII—VII of FIG. 2 and looking in the direction of the arrows thereon.

The friction reducing rails 16, 18, 20 and 22 are similar, as best shown in FIGS. 4, 6 and 7. With reference to rail 16, a plurality of rotatable wheels 26 are mounted within an inverted channel or U-shaped rail member 24. The wheels 26 are disposed between the side flanges 28 and 30 of the rail member and project through and above the web or uppermost rail face 32 thereof. The side flanges 28 and 30 of the rail member are formed into the open lower face thereof and are adapted to receive the head of a bolt 34 in engagement therewith. A threaded nut 33 is received on the end of the bolt 34. The friction reducing rails are secured to their respective cross members 14 by saddles 35 held to the rails by the fasteners 33—34.

The driven conveyor 36 is mounted upon the conveyor bed 10 and includes an endless conveyor belt 40. The conveyor belt 40 circles pulleys 42 and 44, which are rotatably mounted at one end of the conveyor bed, and also circles drive pulleys 46 and 48, which are rotatably mounted at the other end of the conveyor bed.

The conveyor drive means 50, including the drive pulleys 46 and 48, is disposed within a housing 52 provided at one end of the conveyor bed 10. The housing 52 includes side forming plates 54 and 56 which are secured to the underside of the outermost friction reducing rails 16 and 22. The lower ends of these plates are formed to provide inbent flanges 62 and 64 which support braces 58 and 60 extended transversely across the conveyor bed. The drive motor 66 and angle drive unit 68 are mounted on the support braces 58 and 60. The belt driving pulleys 46 and 48 are mounted upon the motor driven shaft 70 which is supported at one end by an upright support 72 mounted on the cross member 58. The drive pulleys 46 and 48 are disposed centrally of the conveyor bed 10 and between the intermost parallel spaced friction reducing rails 18 and 20.

The drive pulleys 46 and 48 are two in number and are spaced apart to accommodate the width of the conveyor belt. This spacing also enables them to receive a rib 74 formed on the underside of the belt member 40. The rib 74 assures that the belt will remain on the driven pulleys and will not move to one side or the other thereof.

The idler pulleys 42 and 44 are freely rotatable at the other end of the conveyor bed 10 within a belt tensioning subassembly 80.

The top run of the conveyor belt 40 is supported and prevented from sagging by a plurality of support members 90, 92, 94 and 96 which are mounted on the conveyor bed 10 in tandem. The conveyor supporting members are mounted on the conveyor bed 10 between the friction reducing rails 16, 18, 20 and 22.

Figure 9:
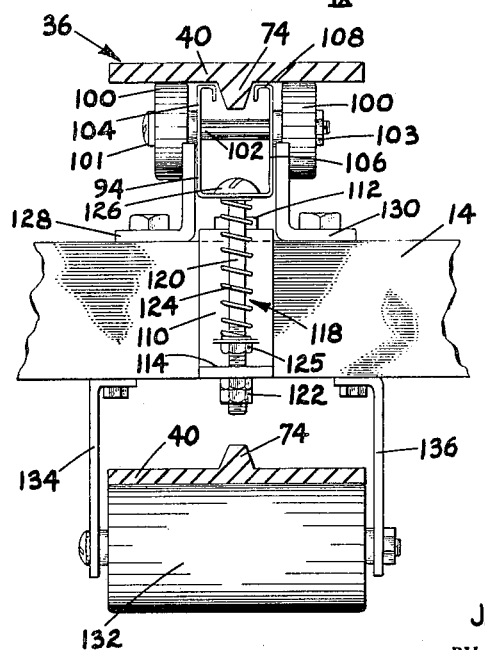
FIG. 9 is an enlarged cross sectional view of the means for supporting the conveyor supporting members as seen in the plane of line IX—IX of FIG. 8 and looking in the direction of the arrows thereon.

Referring to FIG. 9, the conveyor supporting members 90, 92, 94 and 96 are seen to each comprise a channel or U-shaped rail member having a plurality of wheels 100 rotatably mounted on each side thereof. The wheels are supported to the side flanges 104 and 106 of the rail member on a single shaft comprising a bolt having a head 101 at one end and a threaded nut 103 received on the other end thereof. A spacer 102 is received between the flange sides 104 and 106 and serves to hold the open side 108 of the rail open. Such means of mounting the wheels to the rail will be noted to be similar to the means used of mounting a single wheel between the rail flanges in providing the friction reducing rail members.

The support member rails 90, 92, 94 and 96 have their open side 108 disposed upward. In such position the rib 74 on the underside of the conveyor belt 40 is receivable within the open side 108 of the support rails and will be guided thereby.

It should be noted, at this time, that the rails of the friction reducing member 16, 18, 20 and 22 and the rails of the support members 90, 92, 94 and 96 as well as the adjustable legs 12 and their cross members 14 are all formed from the same structural shape; namely channel or U-shaped stock having the side flanges rolled within the open face thereof at their edges. This similarity of parts requires a manufacturer to roll only one type of structural member; the rail. Such rails can be adapted as supports, braces, friction reducing rails with single or double wheels, etc. The wheels may be of the same or different sizes but in all instances may be generally similar. The wheel supporting shafts are likewise similar. The open face of the rail is adapted to receive fastening means within the open face thereof at any position along the length thereof. It will thus be appreciated that a minimum number of different major parts are required in the construction of this conveyor.

Each supporting rail member 90, 92, 94 and 96 is resiliently supporting by one of the conveyor bed cross members 14. The support members have their ends disposed over the cross members and engaged therewith for reciprocal vertical movement independent of any other conveyor supporting rail member.

Figure 8:
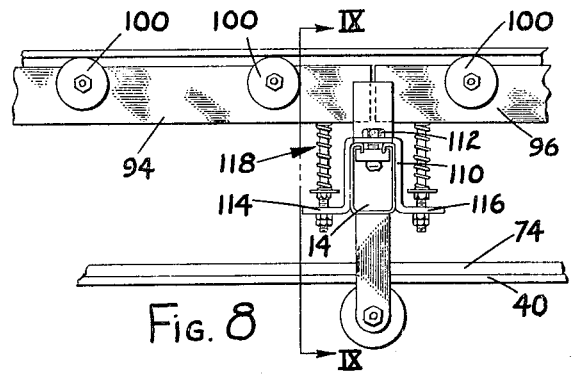
FIG. 8 is an enlarged side elevation view of one of the means of supporting the conveyor supporting members of the proposed conveyor means as seen in the plane of line VIII—VIII of FIG. 2 and looking in the direction of the arrows thereon.

Referring to FIGS. 8 and 9, the means for independently supporting an end of one of the conveyor belt supporting rails 94, for example, is seen to include a saddle bracket 110 received over one of the cross rails 14 and secured thereto by suitable fastening means 112. The cross rail 14 will be noted to have its open face disposed upward in position to receive such fastening means as previously described. The saddle bracket 110 includes horizontally disposed flanges 114 and 116 which extend outward on each side of cross rail 14. Vertically disposed spring posts 118 are secured to these flanges and are disposed for engagement with an end of one of the belt supporting rail members.

Referring to FIG. 9 specifically, the spring posts 118 are seen to include a bolt 120 having the threaded end thereof in threaded engagement with one of the flanges 114 or 116. The bolt is vertically adjustable by lock nuts 122. A compressible coil spring 124 is disposed about the bolt 120. The spring 124 is vertically adjustable on the bolt by a nut and washer 125 threaded thereon, and has the upper end engaged against the bottom surface of the belt supporting rail. The head 126 of the bolt 120 is received within the rail and keeps the rail engaged with the spring. Angle brackets 128 and 130 are mounted on the cross rails 14 and overlap the ends of adjacently disposed and aligned conveyor supporting rails to provide vertical guides therefore.

The return run of the endless conveyor belt 40 is supported by roller members 132 mounted between depending arm brackets 134 and 136 secured to each cross member 14 of the conveyor bed 10.

Operation

The conveyor belt 40 is considered to rotate in a counterclockwise direction in the normal movement of articles from the take-up end of the conveyor towards a stop gate or sweep arm disposed at the other end of the conveyor bed or somewhere along the length thereof. Friction reducing rail member 16 and 18 are disposed on one side of the driven conveyor and friction reducing rail members 20 and 22 are disposed on the other side thereof. The conveyor belt 40 thus travels between the parallel spaced friction reducing rail members.

The rotatable wheels 26 of the friction reducing rail members 16, 18, 20 and 22 provide a vertically fixed load carrying plane. The load carrying surface of the conveyor belt 40 is normally held and disposed slightly above such load carrying plane by the supporting rail members 96, 94, 92 and 90 disposed in tandem thereunder. The belt run is supported on and is rotatable over the wheels 100 of the rail members 96, 94, 92 and 90. The return run of the conveyor belt 40 is supported by the hanging rollers 132.

Each conveyor belt supporting member 96, 94, 92 and 90 is vertically reciprocal on the spring posts 118 with which it is engaged. Each conveyor belt supporting member, when unloaded, holds the belt 40 at substantially the same level above the load carrying plane of the side rails 16, 18, 20 and 22. The springs 124 of each of the spring posts 118 are substantially the same and require the same compression force to allow the depression of the belt supporting member with which they are engaged. Each belt supporting member, with its own supporting springs 124, is a separate and independent operator as regards each other belt supporting member and its supporting springs.

The frictional engagement required between the conveyor belt 40 and articles carried on the conveyor is only such as is necessary to overcome the frictional resistance of the article supporting side rails 16, 18, 20 and 22 to movement of the articles thereover. Thus the weight of an article, or accumulation of articles, is significant only to the extent that such weight increases the frictional resistance to movement in the article supporting side rails. Accordingly, the conveyor belt 40 may be held in light biased engagement with an article, or group of articles, over one of the belt supporting members 96, 94, 92 and 90, as necessary to overcome their individual resistance to movement on the side rails, and without concern for the total weight of the articles on the whole conveyor.

The total end loading on articles accumulated at one end of the conveyor will not exceed the sum of the biasing effort of the individual belt guide supporting springs 124. Accordingly, when light articles are being conveyed lighter springs can be employed and with heavier articles a heavier spring can be used. Thus, the required belt engagement to overcome frictional resistance to movement can be regulated and only such engagement as is necessary need be provided. As a result there is a bare minimum of belt wear when articles pile up and the conveyor belt is required to pass on under them.

The particular manner in which the conveyor belt 40 is guided within the open face of the support rails 96, 94, 92 and 90, and the belt supporting wheels 100 thereof serves to minimize other factors of frictional resistance.

While a preferred embodiment of this invention has been described, it will be understood that other modifications and improvements may be made thereto. Such of these modifications and improvements as incorporate the principles of this invention are to be considered as included in the hereinafter appended claims unless these claims by their language expressly state otherwise.

I claim:

1. A conveyor for transporting and accumulating articles thereon, and comprising; a conveyor bed including parallel spaced friction reducing rail members, said friction reducing rail members including a plurality of wheels rotatably mounted to said rails and having the tops thereof projecting above the top surface of said rails to collectively form a conveying surface, a plurality of cross supports secured between said rails, vertically disposed posts mounted on said cross supports and having a compressible member encircling each thereof, a plurality of separate conveyor supporting members disposed between said rail members in consecutive end to end aligned relation, each end of each of said conveyor supporting members being slidably received on one of said posts and resting on said compressible member and guide elements on each side of and at each end of said conveyor supporting members for guiding the vertical reciprocal movement of said conveyor supporting members on said compressible members, and a driven conveyor member supported on said conveyor supporting members and normally movable thereover with the upper surface thereof yieldingly disposed for vertical movement with respect to the plane of said conveying surface.

2. A conveyor for transporting and accumulating articles thereon, and comprising: a conveyor bed including parallel spaced friction reducing rail members, said friction reducing rail members including a plurality of wheels rotatably mounted to said rails and having the tops thereof projecting above the top surface of said rails to collectively form a conveying surface, a plurality of cross supports secured between said rails, vertically disposed posts mounted on said cross supports and having a compressible member encircling each thereof, a plurality of separate conveyor supporting members disposed between said rail members in consecutive end to end aligned relationship, each end of each of said conveyor supporting members being slidably received on one of said posts and resting on said compressible member and guide elements on each side of and at each end of said conveyor supporting members for guiding the vertical reciprocal movement of said conveyor supporting members on said compressible members, and a driven conveyor member supported on said conveyor supporting members and normally movable thereover with the upper surface thereof yieldingly disposed for vertical movement with respect to the plane of said conveying surface; means for adjusting the supporting pressure exerted by said compressible members against said conveyor supporting members.

3. A conveyor for transporting and accumulating articles thereon, and comprising: a conveyor bed having a friction reducing conveying surface; said conveying surface having a medial lane; said conveyor bed having a plurality of cross supports extending transversely of said medial lane, vertically disposed posts mounted on said cross supports in said medial lane and having a compressible member encircling each thereof, a plurality of separate conveyor supporting members disposed in said medial lane in consecutive end to end aligned relationship, each end of each of said conveyor supporting members being slidably received on one of said posts and resting on said compressible member and guide elements on each side of and at each end of said conveyor supporting members for guiding the vertical reciprocal movement of said conveyor supporting members on said compressible members, and a driven conveyor member supported on said conveyor supporting members and normally movable thereover with the upper surface thereof yieldingly disposed for vertical movement with respect to the plane of said conveying surface; means for adjusting the supporting pressure exerted by said compressible members against said conveyor supporting members.

References Cited in the file of this patent

UNITED STATES PATENTS

| | | |
|---|---|---|
| 207,626 | Sargent | Sept. 3, 1878 |
| 1,209,021 | Phillips | Dec. 19, 1916 |
| 1,598,099 | Murray | Aug. 31, 1926 |
| 2,158,364 | Hahn | May 16, 1939 |
| 2,410,611 | Pratt et al. | Nov. 5, 1946 |
| 2,895,593 | McKnight et al. | July 21, 1959 |